P. MALTBY.
WRIST PIN TURNER.

No. 84,954. Patented Dec. 15, 1868.

Witnesses.
Geo. W. Tibbitts
J. Cohnes.

Inventor.
Philo Maltby

UNITED STATES PATENT OFFICE.

PHILO MALTBY, OF CLEVELAND, OHIO.

Letters Patent No. 84,954, dated December 15, 1868.

IMPROVED WRIST-PIN TURNER.

The Schedule referred to in these Letters Patent and making part of the same.

*To all whom it may concern:*

Be it known that I, PHILO MALTBY, of Cleveland, county of Cuyahoga, in the State of Ohio, have invented a new and improved Wrist-Pin Turner; and I do hereby declare that the following is a full and exact description thereof, reference being had to the accompanying drawings, and to the letters of reference marked thereon.

Figure 1:
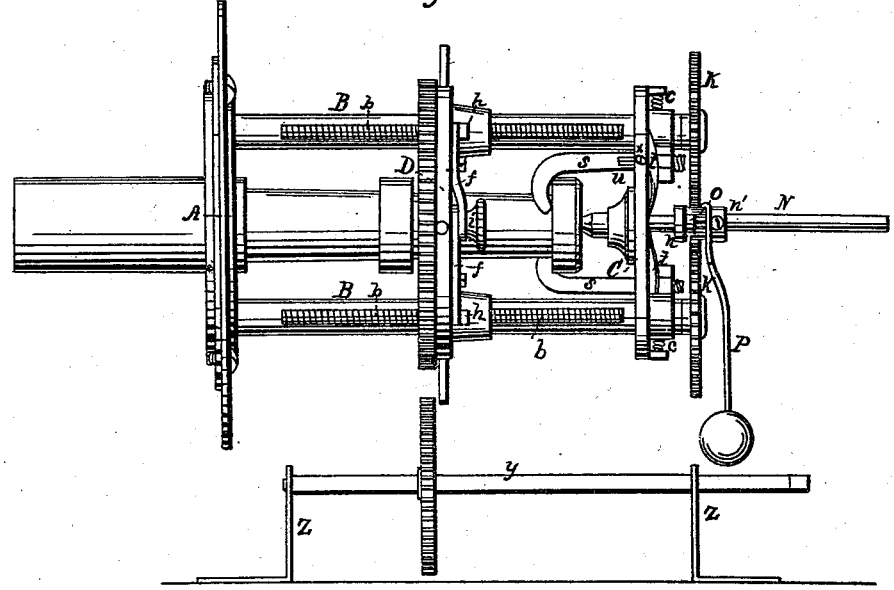
Figure 1 is a horizontal side elevation.
Figure 2:
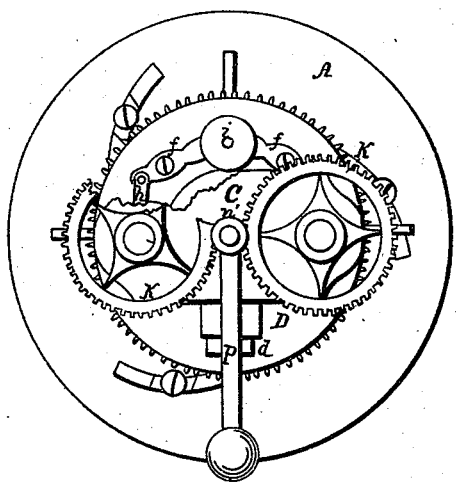
Figure 2 is an end view.

The nature of this invention relates to the construction and arrangement of a machine for turning wrist-pins while remaining in their place, in locomotives or other engines, or the turning of journals on the end of a shaft where said machine can be applied, whereby said pins may be dressed or turned whenever they become worn or require renewing, without having to remove them from the engine for that purpose.

The following is a description of my invention.

A represents a universal chuck, arranged for centring the machine to the original centre of the pin, to which are attached two hollow rods or pipes, B B, at the end of which is placed a cross-head. This cross-head is provided with set-screws, $c$ $c$, by which it may be fastened at any desired point upon the pipes B B, for the purpose of adjusting it to accommodate it to any length of pin.

Within these pipes are placed screws, $b$ $b$, employed, as hereinafter described, as feed-saws.

Arranged upon these rods B B is the cutting-head D, which has an adjustable socket, $d$, for holding the cutter $d'$, and also provided with an arrangement of levers, $f$ $f$, for throwing the head into and out of gear with the said screws $b$ $b$.

Said levers are held in position by the thumb-nut $i$.

The levers are attached to half nuts, $h$ $h$. These half nuts mesh with the thread of the screws $b$ $b$, which when in gear perform the operation of feeding or carrying the head along.

Upon the end of the screw $b$ $b$ are cog-wheels K K, which mesh with the pinion O upon the centre-shaft N. Upon this shaft, and secured to the pinion O, is placed a lever, P, to which may be attached a weight, so that when the machine is turning, the said wheels K K revolve round the pinion O, while the latter is held stationary by the lever P, thus causing the cutting-head to be fed or carried along the rods B B.

The centre-shaft N is secured to the cross-head C, and is provided with adjustable collars, $n$ $n'$, by which the pinion O may be adjusted to its position in relation with the wheels K K, whenever the cross-head may be removed, and is turned down to a point at its inner end, which serves as a centring-point to the wrist-pin.

Attached to the cross-head are the hooks S S, which are intended to embrace the outer collar and hold the machine upon the pin while in operation. They pass through the head C, and are provided with a spring, $t$, which enables them to yield to any inequalities of the collar, as it may be worn, and to make them adjustable to different-sized pins.

Grooves are made in the side of the hooks at $u$ $u$, into which the set-screws $x$ $x$ rest. This prevents the hooks from turning around in their place, and still permits the hooks to give endwise, if necessary.

The manner of operating this machine may be performed by having holes made in the periphery of the cutting-head D, and handles inserted similar to a pilot-wheel, by which it is to be turned; or there may be placed a shaft, $y$, having a wheel upon it, which will traverse the shaft as the machine is operated, to follow and mesh with the cutting-head D, and mounted upon the bearings $z$ $z$, the shaft having a crank attached to it for turning the same. This arrangement may be placed upon a bench on the floor, and the machine brought in contact with it to operate it.

The power for operating this machine is applied directly to the cutting-head D, as will be seen, by which arrangement there is no twisting or straining upon the other parts of the machine, which enables it to perform the work more perfectly.

What I claim as my improvement, and desire to secure by Letters Patent, is—

1. The cutting-head D, provided with the adjustable tool-holder and feeding-device, in combination with pipes B B, substantially as and for the purpose specified.

2. The feeding-screws $b$ $b$, wheels K K, pinion O, and weighted lever P, combined and arranged substantially as shown.

3. The adjustable cross-head C, centre-shaft N, adjustable hooks S S, spring $t$, and set-screws $x$ $x$, arranged and operating substantially as and for the purpose set forth.

PHILO MALTBY.

Witnesses:
GEO. W. TIBBITTS,
GEO. HESTER.